United States Patent
Wolf et al.

(10) Patent No.: US 10,308,738 B2
(45) Date of Patent: Jun. 4, 2019

(54) POLYMERIZATION PLANT HAVING PARALLEL COOLING CHANNELS IN A RECYCLE CONNECTION

(71) Applicant: Basell Polyolefine GmbH, Wesseling (DE)

(72) Inventors: Christoph Wolf, Pulheim-Dansweiler (DE); Andre-Armand Finette, Cologne (DE); Andrei Gonioukh, Erftstadt (DE); Dieter Littmann, Muecke (DE); Thomas Herrmann, Cologne (DE); Georg Groos, Dannstadt-Schauernheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/579,882

(22) PCT Filed: Jun. 14, 2016

(86) PCT No.: PCT/EP2016/063562
§ 371 (c)(1),
(2) Date: Dec. 5, 2017

(87) PCT Pub. No.: WO2016/202766
PCT Pub. Date: Dec. 22, 2016

(65) Prior Publication Data
US 2018/0171044 A1    Jun. 21, 2018

(30) Foreign Application Priority Data

Jun. 15, 2015 (EP) .................................. 15172062

(51) Int. Cl.
*C08F 110/02* (2006.01)
*C08F 2/04* (2006.01)
*B01J 19/24* (2006.01)

(52) U.S. Cl.
CPC ......... *C08F 110/02* (2013.01); *B01J 19/2415* (2013.01); *B01J 19/2465* (2013.01);
(Continued)

(58) Field of Classification Search
CPC ........ B01J 19/2415; B01J 19/24; B01J 19/18; C08F 10/02; C08F 2/01; C08F 2/04
(Continued)

(56) References Cited

U.S. PATENT DOCUMENTS 7,678,341 B2   3/2010   Smith
9,174,192 B2   11/2015  Teles et al.
(Continued)

FOREIGN PATENT DOCUMENTS

CN   1911893 A    2/2007
CN   101232939 A  7/2008
(Continued)

OTHER PUBLICATIONS

The International Search Report and Written Opinion for PCT/EP2016/063562 dated Sep. 2, 2016.

*Primary Examiner* — William K Cheung (57) ABSTRACT

The present disclosure relates to a plant for performing polymerization, such as the polymerization of ethylene, having a recycle connection with two or more cooling channels arranged in parallel, a process for polymerization and downstream processes, and a plant for polymerization, comprising the following plant components in fluid communication:
  a) A reactor with an inlet side and an outlet side;
  b) A recycle connection positioned in fluid communication between the outlet side of the reactor and the inlet side of the reactor; wherein the recycle connection comprises two or more cooling channels arranged in parallel.

19 Claims, 2 Drawing Sheets

(52) U.S. Cl.
CPC ....... *C08F 2/04* (2013.01); *B01J 2219/00081* (2013.01); *B01J 2219/00092* (2013.01); *B01J 2219/24* (2013.01); *Y02P 20/582* (2015.11)

(58) Field of Classification Search
USPC ..................................................... 526/63, 64
See application file for complete search history.

(56) References Cited

U.S. PATENT DOCUMENTS

| | | |
|---|---|---|
| 9,273,162 B2 | 3/2016 | Weiand et al. |
| 9,975,968 B2 | 5/2018 | Banat et al. |
| 2003/0206835 A1 | 11/2003 | Donck |
| 2004/0222711 A1* | 11/2004 | Klimt .................. H02K 9/18 310/59 |
| 2010/0087606 A1 | 4/2010 | Karjala et al. |
| 2013/0071293 A1 | 3/2013 | Steynberg et al. |
| 2015/0284481 A1* | 10/2015 | Cai et al. .................. C08F 2/01 526/348 |
| 2016/0289356 A1 | 10/2016 | Finette et al. |

FOREIGN PATENT DOCUMENTS

| | | |
|---|---|---|
| CN | 102361687 A | 2/2012 |
| CN | 106414519 A | 2/2017 |
| RU | 2391132 C2 | 6/2010 |
| WO | WO-2006097904 A2 | 9/2006 |
| WO | 2010042390 A1 | 4/2010 |
| WO | 2012084772 A1 | 6/2012 |
| WO | 2014095708 A1 | 6/2014 |

\* cited by examiner

POLYMERIZATION PLANT HAVING PARALLEL COOLING CHANNELS IN A RECYCLE CONNECTION

This application is the U.S. National Phase of PCT International Application PCT/EP2016/063562, filed Jun. 14, 2016, claiming benefit of priority to European Patent Application No. 15172062.0, filed Jun. 15, 2015, the disclosures of which are incorporated herein by reference in their entirety.

FIELD OF THE INVENTION

The present disclosure relates to a plant for polymerization, such as for the polymerization of ethylene, having a recycle connection with two or more cooling channels arranged in parallel. The present disclosure relates to a plant for polymerization, a process for polymerization and downstream processes.

BACKGROUND OF THE INVENTION

The polymerization of ethylene is a process for the production of polyethylene or for the production of copolymers from ethylene with other comonomers. Polyethylene or such copolymers are employed extensively in both durable and disposable goods, particularly in the form of molded plastic parts or as plastics films. Plastic films and molded containers are used ubiquitously as packaging in the food and other retail industry. Other uses for molded plastic parts include but are not limited to consumer electronics, automobiles, domestic furniture and utensils, construction and medical applications.

EP 1 589 043 A2 explores the use of comonomers and chain transfer agents and their effect on the physical properties of a polymer product.

US 2010/087606 A1 explores the use of multiple feeds for introducing monomers and catalysts into a reactor and the effect on the physical properties of a polymer product.

US 2004/247493 A1 explores the effect of chain transfer agents on the physical properties of a polymerization product.

Given the economic significance of polymerization reactions, there remains a need in the art for improved polymerization processes and plants.

BRIEF SUMMARY OF THE INVENTION

The present disclosure relates to the polymerization of ethylene and provides an improved plant and/or an improved process for the polymerization of ethylene.

The present disclosure provides a plant and/or process for the polymerization of ethylene which allows an improved energy efficiency, an improved output rate or a reduced process down time or a combination of these effects A contribution to achieving at least one of the above described effects is made by the subject matter of the category forming claims of the present disclosure. A further contribution is made by the subject matter of the dependent claims of the present disclosure which represent specific embodiments of the present disclosure.

DETAILED DESCRIPTION OF THE INVENTION

A contribution to achieving at least one of the above described objects is made by the following embodiments of the present disclosure:

|1| A plant for performing polymerization, comprising the following plant components in fluid communication:
  a) A reactor with an inlet side and an outlet side;
  b) A recycle connection positioned in fluid communication between the outlet side of the reactor and the inlet side of the reactor; wherein the recycle connection comprises two or more, or 10 or more, or 100 or more, or 300 or more, cooling channels arranged in parallel. For example, as many as about 4000 cooling channels arranged in parallel may be employed in a recycle connection according to the present disclosure.

|2| The plant according to embodiment |1|, wherein the recycle connection comprises a bundle cooler which comprises two or more, or 5 or more, or 50 or more, or 200 or more, cooling channels. Bundle coolers with as many as 1000 cooling channels may be employed according to the present disclosure.

|3| The plant according to embodiment |1| or |2|, wherein the recycle connection comprises two or more bundle coolers arranged in parallel, each comprising two or more, or 5 or more, or 50 or more, or 200 or more, cooling channels.

|4| The plant according to any of the preceding embodiments, wherein the reactor is a tubular reactor. In one aspect of this embodiment, the tubular reactor comprises a tube with a length in a range from about 1 km to about 10 km, or from about 1.5 to about 7 km, or from about 2 to about 5 km. In one aspect of this embodiment, the tube has an internal diameter in a range from about 10 to about 200 mm, or from about 15 to about 150 mm, or from about 20 to about 100 mm. The tube may be built from several tube sections, or from about 10 to about 500 tube sections, or from about 50 to about 300 tube sections. Furthermore, the tube sections may have a length in the range from about 5 to about 30 m, or from about 7 to about 25 m. Moreover, the tube sections may be connected gas and pressure tight, wherein this connection may be obtained by flanging. In an embodiment, less than 10% of the tube sections are connected by welding. The tube sections may comprise an inner tube and a coolant jacket at least partially surrounding the inner tube. In an embodiment, the inner tube is capable of withstanding higher presser than the water jacket.

|5| The plant according to any of the preceding embodiments, wherein at least one of the cooling channels is arranged vertically, where the angle with the vertical may be less than about 20°, or less than about 10°, or less than about 5°.

|6| The plant according to any of the preceding embodiments, wherein at least one of the cooling channels or two or all of the cooling channels satisfy one or more, or two or all, of the following criteria:
  a) The length of the cooling channel is less than about 200 m, or less than about 50 m, or less than about 20 m;
  b) The cross-sectional diameter of the inside of the cooling channel is in a range from about 5 mm to about 200 mm, or from about 7 to about 120 mm, or from about 10 to about 80 mm.
  c) The cooling channel is designed to be operated with a pressure drop between the inlet and the outlet below about 20 MPa, or below about 15 MPa, or below about 5 MPa. In some cases, the pressure drop between the input and the output is as low as about 0.2 MPa.

|7| A process for the preparation of a polymer by polymerizing ethylene in a plant according to any of the embodiments |1| to |6|.

|8| The process according to embodiment |7|, wherein the process is a continuous process.

|9| The process according to embodiment |7| or |8|, wherein the pressure drop across the recycle connection is less than about 20 MPa, or less than about 15 MPa, or less than about 10 MPa.

|10| The process according to any of the embodiments |7| to |9|, wherein the speed of fluid to be cooled flowing in one or more of the cooling channels, for example during standard operation of the plant, is less than about 10 m/s, or less than about 5 m/s, or less than about 3 m/s.

|10a| The process according to any of the embodiments |7| to |10|, wherein the speed of coolant flowing in one or more of the cooling channels, for examples during standard operation of the plant, is in the range from about 0.1 to about 5 m/s, or from about 0.3 to about 3 m/s, or from about 0.5 to about 1 m/s.

|10b| The process according to any of the embodiments |7| to |9|, wherein the speed of fluid to be cooled flowing in one or more of the cooling channels, for example during a cleaning or dewaxing mode of the plant, is less than about 0.3 m/s, or less than about 0.25 m/s, or less than about 0.2 m/s.

|10c| The process according to any of the embodiments |7| to |10|, or |10b|, wherein the speed of coolant flowing in one or more of the cooling channels, for example during a cleaning or dewaxing mode of the plant, is less than about 0.3 m/s, or less than about 0.25 m/s, or less than about 0.2 m/s.

|11| The process according to any of the embodiments |7| to |10|, wherein the ethylene is comprised in a fluid, comprising the following step:
  a) A first portion of the fluid flows through a subset A, consisting of one or more of the cooling channels, with a mass flow rate $\alpha$, and a second portion of fluid flows through a subset B, consisting of one or more of the cooling channels not belonging to subset A, with a mass flow rate $\beta$, wherein $\alpha$ is at least twice $\beta$, or at least five times $\beta$, or at least fifteen times $\beta$; wherein the mass flow rates $\alpha$ and $\beta$ are in terms of the mass flowing through the respective cooling channels per second, expressed in $kg \cdot s^{-1}$.

|12| The process according to embodiment |11|, wherein, in step a), the mass flow rate of coolant supplied to the subset A is higher than the mass flow rate of coolant supplied to the subset B by at least about 10%, or at least about 20%, or at least about 50%, based on the mass flow rate of coolant supplied to the subset B, wherein mass flow rate is in terms of the mass of coolant flowing per second, expressed in $kg \cdot s^{-1}$.

|13| The process according to embodiment |11| or |12|, wherein, in step a), the temperature of the coolant supplied to the subset B is higher than the temperature of coolant supplied to subset A by at least about 5 K, or by at least about 10 K, or by at least about 15 K.

|14| The process according to any of the embodiments 11 to 13, wherein, in step a), one or both of the following criteria is/are satisfied:
  i. The subset A is supplied with a liquid phase coolant; or
  ii. The subset B is supplied with a gas phase coolant.
  In the various aspects of this embodiment, the following combinations of criteria are fulfilled: i, ii, and i+ii.

|15| The process according to any of the embodiments |11| to |13|, further comprising the following step:
  b) A first portion of the fluid flows through the subset A of the cooling channels with a mass flow rate $\gamma$, and a second portion of the fluid flows through the subset B of the cooling channels with a mass flow rate $\delta$, wherein $\delta$ is at least twice $\gamma$, or at least five times $\gamma$, or at least sixteen-times $\gamma$;
  wherein mass flow rates $\gamma$ and $\delta$ are in terms of the mass flowing through the respective cooling channels per second, expressed in $kg \cdot s^{-1}$.

|16| The process according to embodiment |15|, wherein, in step b), one or more of the following criteria is/are satisfied:
  i. the mass flow rate of coolant supplied to the subset B is higher than the mass flow rate of coolant supplied to the subset A by at least about 10%, based on the mass flow rate of coolant supplied to the subset A, wherein mass flow rate is in terms of the mass of coolant flowing per second, expressed in $kg \cdot s^{-1}$.
  ii. the temperature of coolant supplied to subset A is higher than the temperature of coolant supplied to subset B by at least about 5 K;
  iii. the subset A is supplied with a gas phase coolant; and
  iv. the subset B is supplied with a liquid phase coolant.
  In the various aspects of this embodiment, the following combinations of criteria are fulfilled: i, ii, iii, iv, i+ii, i+iv, ii+iii, ii+iv, iii+iv, i+ii+iii, i+ii+iv, i+iii+iv, ii+iii+iv, and i+ii+iii+iv.

|17| A process for the preparation of a downstream product comprising the following preparation steps:
  a) Preparation of a polymer by a process according to any of the embodiments |7| to |16|; and
  b) Further treatment of the polymer to obtain the downstream product.

|18| The process according to any of the embodiments |7| to |17|, wherein the polymer or downstream product is converted into a shaped body.

In the following, the term "fluid communication" signifies that fluid can pass from a first component to a second component, either directly or via at least a third component. The term "direct fluid communication" signifies that no other component is located between the first and the second component. "Direct fluid communication" could also signify that one or more trivial components, such as one or more joining tubes and/or one or more valves, are located between the first component and the second component.

The term "inlet" signifies the point at which fluid enters a component and the term "outlet" signifies the point at which fluid exits a component. In this context, the "inlet" and "outlet" are defined by a direction of fluid flow which is defined either by the direction of fluid flow during standard operation of the plant, or of the direction of fluid flow for which the plant has been designed. In the case of a component through which fluid might flow in either direction, the direction of flow for determination of the inlet and outlet is that associated with the primary function of the component.

Plant

Figure 1:
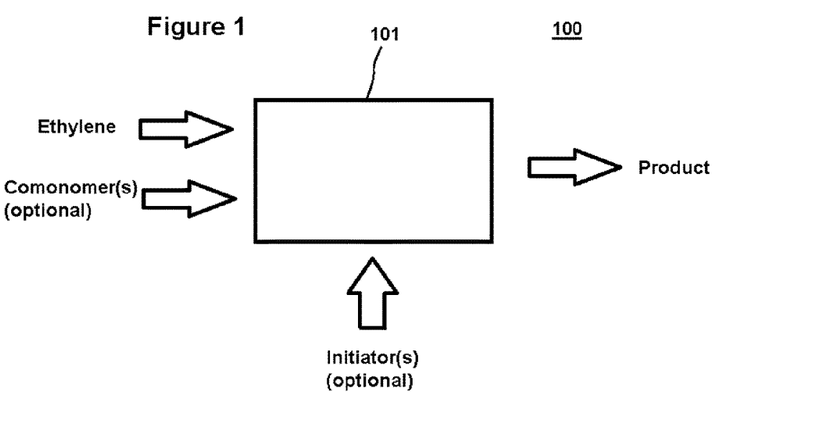
FIG. 1 shows embodiments of a plant according to the present disclosure.

A plant according to the present disclosure may be used for the polymerization of ethylene, optionally in the presence of other comonomers. The general function of the plant is illustrated in FIG. 1, which is for illustrative purposes and is not to be considered as limiting the scope of the present disclosure. The plant may provide an improved effective yield, for example by recycling reactants; and/or improved energy efficiency, or by heat recycling and/or use of byproducts as fuel; or both.

One configuration of the plant might be as follows:
1) An ethylene source;
2) A primary compressor, for example being capable of outputting fluid at a pressure in the range from about 0 to about 50 MPa, or from about 10 to about 45 MPa, or from about 20 to about 35 MPa;
3) A secondary compressor, for example being capable of outputting fluid at a pressure in the range from about 50 to about 500 MPa, or from about 100 to about 450 MPa, or from about 200 to about 400 MPa;
4) A heat exchanger;
5) A reactor;
6) A primary pressure let down;
7) A cooler;
8) A separator;
9) A secondary pressure let down;
10) A separator;
11) A product pelletizer;
12) A primary recycle connection with inlet in fluid communication with at least one output of the separator 8) and with outlet in fluid communication with the inlet of the secondary compressor, wherein the primary recycle connection comprises at least two cooling channels and at least one separator; and
13) A secondary recycle connection with inlet in fluid communication with at least one output of the separator 11) and with outlet in fluid communication with the inlet of the primary compressor, wherein the secondary recycle connection comprises at least one cooling channel and at least one separator;

wherein components 1-11 may be in fluid communication in the order of 1-11 above, and components 12 and 13 constitute recycle loops as detailed above.

In the context of this present disclosure, the plant can be logically divided into the following regions:
a. The inlet side of the reactor (items 1 to 4 above);
b. The reactor (item 5 above);
c. The outlet side of the reactor (items 6 to 11 above);
d. A first recycle connection (item 12 above) connecting c. to a.; and
e. Optionally further recycle connections (item 13 above) connecting c. to a.

Figure 2:
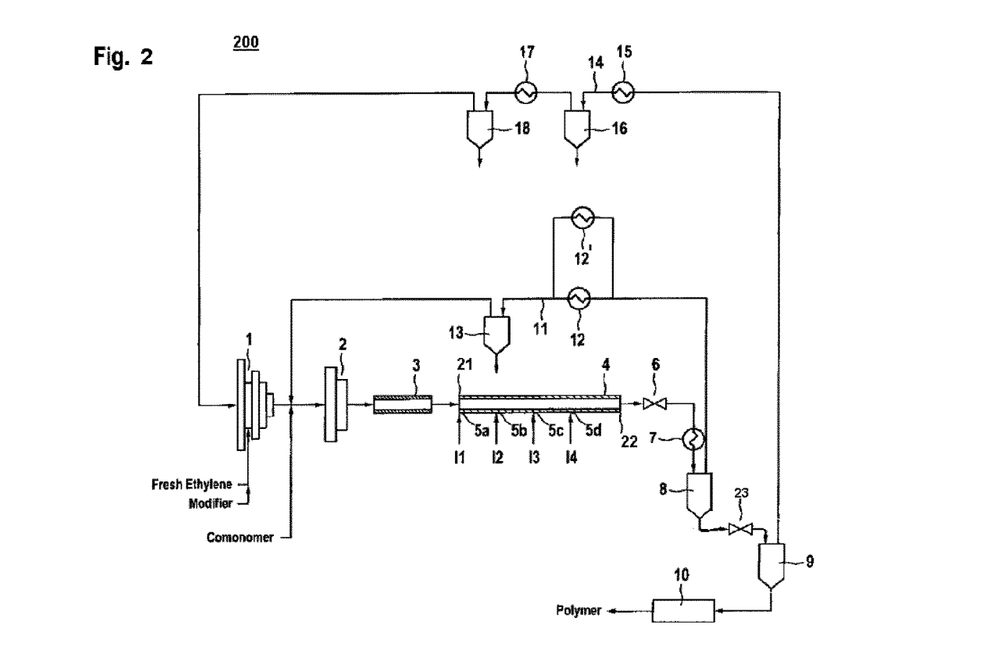
FIG. 2 shows schematically the layout of an embodiment of a plant according to the present disclosure.

The skilled person has knowledge of plants for performing polymerization and may include further components or remove components in considering fit for achieving the effects of the present disclosure. An embodiment for a layout of the plant is shown in FIG. 2.

In one embodiment of the present disclosure, the reactor and the primary pressure let down are comprised in a chamber. This chamber, also called a reactor chamber, may be reinforced concrete housing.

Reactor

Reactors in the context of the present disclosure may have an interior and an exterior, wherein ethylene can be polymerized, optionally in the presence of other comonomers, in the interior of the reactor.

The reactor may have an inlet and an outlet. In one embodiment, the reactor may be employed in a reactive flow in which fluid enters at the inlet of the reactor and exits at the outlet of the reactor. In one embodiment, the reactor further comprises one or more further openings, other than the inlet and the outlet, which link(s) the exterior and the interior of the reactor, such as openings through which fluid can flow between the interior and the exterior, for example in a controlled manner, such as being controlled by one or more valves.

In one embodiment, the reactor comprises one or more openings through which material may enter the reactor; the material may comprise a comonomer or an initiator, or both. The reactors may be tubular reactors.

In one embodiment of the present disclosure, the reactor has a minimum flow distance between its input and its output of at least about 100 m, or at least about 500 m, or at least about 1 km, or at least about 2 km. In one embodiment, the reactor has one or more sites at which a material, such as an initiator, can be introduced into the reactor.

In one embodiment of the present disclosure, the reactor is of the autoclave type, for example with at least one stirrer comprised within the reactor. In one aspect of this embodiment, the minimum flow distance between the input and output is in a range from about 1 to about 50 m, or from about 3 to about 30 m, or from about 5 to about 20 m.

Compressors

Compressors may increase the pressure of a fluid in the plant. In an embodiment, fluid may enter the compressor at a pressure PIN and exits the compressor at a pressure POUT, wherein POUT is greater than PIN, for example by at least about 0.5 MPa, or by at least about 1 MPa, or by at least about 5 MPa.

In one embodiment, the plant comprises a first compressor, which may be the above mentioned secondary compressor, wherein the first compressor, such as the outlet side of the first compressor, may be in fluid communication with the reactor, such as with the inlet side of the reactor. In an aspect of this embodiment, the plant further comprises a further compressor, which may be the above mentioned primary compressor, wherein the further compressor, such as the outlet side of the further compressor, may be in fluid communication with the reactor, such as with the inlet side of the reactor, for example via the first compressor, such as with the outlet of the second compressor in fluid communication with the inlet of the first compressor.

In one embodiment, the first compressor is suppliable with fluid at a pressure in a range from about 1 to about 100 MPa, or from about 5 to about 70 MPa, or from about 10 to about 50 MPa. In one embodiment, fluid exits from the first compressor at a pressure in a range from about 120 to about 500 MPa, or from about 200 to about 450 MPa, or from about 230 to about 400 MPa.

In one embodiment, the further compressor is suppliable with fluid at a pressure in a range from about 0.01 to about 7 MPa, or from about 0.05 to about 5 MPa, or from about 0.1 to about 3 MPa. In one embodiment, fluid exits from the further compressor at a pressure in a range from about 10 to about 100 MPa, or from about 15 to about 70 MPa, or from about 20 to about 50 MPa.

In one embodiment of the present disclosure, one or more compressors may have an output pressure which is largely independent of the pressure of input fluid supplied to it. In one aspect of this embodiment, one or more of the compressors, for example the first compressor (secondary compressor), provide(s) an output pressure which does not increase by more than about 20%, or not by more than about 10%, or not by more than about 5%, when the input pressure is increased from 25 MPa to 35 MPa, the percentage (%) change in output pressure being based on the output pressure for an input pressure of 25 MPa.

Coolers

Cooling channels in the context of the present disclosure may be components of the plant which allow a flow of fluid through an interior between an inlet and an outlet and may be used for reducing the temperature of the fluid, such as in a controllable manner. In an embodiment, cooling channels are suppliable with coolant fluid to an exterior region not in fluid communication with the interior.

In the context of the present disclosure, reference to a single cooling channel means a single tube, or a topological equivalent, connecting input and output. Where two or more tubes arranged in parallel connecting the input and the output, or a topological equivalent, are meant, reference will be made to two or more cooling channels.

In an embodiment of the present disclosure, the plant comprises a recycle connection, such as a high pressure recycle connection, connecting the outlet side of the reactor to the inlet side of the reactor, wherein the recycle connection comprises two or more cooling channels.

In one embodiment of the present disclosure, the recycle connection comprises one or more bundle coolers, each comprising two or more cooling channels.

A bundle cooler in the context of the present disclosure may comprise two or more, or 10 or more, or 50 or more, or 100 or more cooling channels arranged in parallel. In one aspect of this embodiment, two or more of the cooling channels, or all of the cooling channels, in the bundle cooler are connected to a single chamber at their input side. In one aspect of this embodiment, two or more of the cooling channels, or all of the cooling channels, in the bundle cooler are connected to a single chamber at their output side. In one aspect of this present disclosure, the cooling channels of the bundle cooler are contained inside a housing. In one aspect of this present disclosure, two or more of the channels, or all of the channels, of the bundle cooler are coolable with a shared coolant, for example with the shared coolant forming a single connected fluid.

In one embodiment of the present disclosure, one or more of the cooling channels has a short minimum path length between inlet and outlet. The inlet and outlet to the cooling channel may mark the beginning and end of the section of flow which is coolable by the coolant. In one aspect of this embodiment, one or more of the cooling channels has a minimum path length between inlet and outlet in a range from about 1 m to about 100 m, or from about 2 m to about 50 m, or from about 2.5 m to about 20 m.

In one embodiment, one or more of the cooling channels, for example comprised in one or more of the bundle coolers, is arranged vertically, such as making an angle of less than 20°, or less than about 10°, or less than about 5°, with the vertical component. In one aspect of this embodiment, at least one cooling channel is arranged such that, in use, fluid flows downward through the cooling channel, such as at an angle less than 20°, or less than about 10°, or less than about 5°, from the vertical component. In one aspect of this embodiment, at least one cooling channel is arranged such that coolant for the cooling channel flows upwards, such as at an angle less than 20°, or less than about 10°, or less than about 5°, from the vertical component.

In another embodiment, the cooler is almost vertical in its orientation.

In one embodiment of the present disclosure, one or more coolers, such as one or more coolers in a recycle connection, has a collection basin for collecting material falling from the cooler. The collection basin may be arranged after the cooler in the direction of flow.

In one embodiment, one or more cooling channels, for example comprised in one or more bundle coolers, are not significantly bent, such as having a minimum scalar product between any two normalized vectors comprised in the minimum path between the inlet and the outlet of the cooling channel of at least about 0.8, or at least about 0.9, or at least about 0.95.

In a further embodiment, one or more cooling channels has/have one or more bends, such as forming a U shape or an inverted U shape. In one aspect of this embodiment one or more cooling channels has/have one or more bends with an angle greater than about 30°, or greater than about 60°, or greater than about 75°.

In one embodiment, the one or more cooling channels incorporate(s) or is/are in fluid communication with a separator, or is/are in direct fluid communication with a separator. In one aspect of this embodiment, the separator is located below the one or more cooling channels, for example so that one or more side-products can drop from the one or more cooling channels into the separator. In one aspect of this embodiment, the one or more coolers does/do not comprise a filter.

Separators

Separators may be used for separating the fluid flow into two or more constituents, such as two or more constituents selected from the group consisting of a reactant, a product, an impurity, a by-product and a catalyst. In one embodiment, the plant comprises one or more separators, which are preceded, or directly preceded, by one or more cooling channels. In one embodiment, the plant comprises one or more separators which may be used for separating a fluid into two or more constituents, wherein two of the constituents are in different phases, such as two different phases selected from the group consisting of a gas, a liquid, a solid, a hypercritical fluid and a meta-phase.

Flares

Flares in the context of the present disclosure may be used for combustion of material, such as of fluid. In one embodiment of the present disclosure, the plant comprises one or more flares.

Recycle Connection

A recycle connection may be positioned in fluid communication between the outlet of the reactor and the inlet of the reactor. The recycle connection may allow the content of one or more products/side-products, such as a waxy product/side-product, in the stream to be reduced. The recycle connection may decrease the weight percentage (wt. %) of one or more products/side-products, or of one or more waxy products/side-products in the fluid flow, for example by at least about 0.01 wt. %, or by at least about 0.05 wt. %, or by at least about 0.1 wt. %, this decrease in wt. % being expressed as the wt. % in the input minus the wt. % in the output.

In one embodiment of the present disclosure, the fluid flow through the recycle connection comprises one or more comonomers, for example in a range from about 0 to about 50, or from about 0 to about 40 wt. %, or from about 0 to about 30 wt. %. In an embodiment, the comonomer is not significantly removed from the fluid in the recycle connection, rather the wt. % of comonomer in the fluid may increase with the removal of constituents other than comonomer or ethylene. In certain embodiments, the wt. % of comonomer in the fluid may increase by at least about 2 wt. %, or at least about 5 wt. %, or at least about 10 wt. %, where the increase in wt. % is expressed as the wt. % in the output minus the wt. % in the input.

In one embodiment of the present disclosure, the output of the recycle connection comprises an ethylene concentration in the range from about 50 to about 100 wt. %, or about 65 to about 100 wt. %, or about 70 to about 100 wt. %. The fluid communication between the outlet of the reactor and the inlet of the recycle connection may be direct or indirect, for example via one or more components selected form the group consisting of a cooler, a separator and a pressure let down.

In one embodiment, the plant comprises a high pressure recycle connection, which is suppliable with fluid at a pressure in a range from about 10 to about 100 MPa, or about 15 to about 70 MPa, or about 20 to about 50 MPa.

In one embodiment, the plant comprises a low pressure recycle connection, which is suppliable with fluid at a pressure in a range from about 0.01 to about 20 MPa, or about 0.05 to about 10 MPa, or about 0.1 to about 5 MPa.

In one embodiment, the plant comprises one or more recycle connections exhibiting a low pressure drop between inlet and outlet, for example exhibiting a difference in pressure of less than about 50 MPa, or less than about 20 MPa, or less than about 5 MPa. In one aspect of the disclosure, the plant comprises a high pressure recycle connection exhibiting a low pressure drop between the inlet and the outlet.

The stream may be cooled by passing through the recycle connection, for example to an extent which allows a favorable stream temperature for re-introduction into the compressor.

In one embodiment, the temperature drop in the stream on passing through the recycle connection is in a range from about 50 K to about 300 K, or about 180 K to about 290 K, or about 200 K to about 260 K.

In one embodiment, the stream enters the recycle connection at a temperature in a range from about 100° C. to about 380° C., or about 150° C. to about 350° C., or about 200° C. to about 300° C.

In one embodiment, the stream exits the recycle connection at a temperature in the range from about 20° C. to about 80° C., or in the range from about 30° C. to about 60° C., or in the range from about 35° C. to about 55° C.

In one embodiment, the stream passes through two or more coolers in the recycle connection. In one aspect of this embodiment, the temperature of the stream is reduced by between about 20 K and about 150 K, or about 25 K and about 130 K, or between about 35 K and about 110 K in the first of the two or more coolers. In another aspect of this embodiment, the temperature of the stream is reduced by between about 20K and about 150 K, or between about 25 K and 130 K, or between about 35 K and about 110 K in the second of the two or more coolers.

Process

A contribution to achieving at least one of the above described objects is made by a process for polymerization in a plant according to the disclosure, for example for the polymerization of ethylene including but not limited to the copolymerization of ethylene with other comonomers.

The polymerization may be carried out at a temperature in a range from about 100° C. to about 380° C., or about 130° C. to about 365° C., or in the range from about 150° C. to about 350° C.

The polymerization may be carried out at a pressure in a range from about 100 MPa to about 400 MPa, or about 125 MPa to about 350 MPa, or about 150 MPa to about 325 MPa.

A contribution to achieving at least one of the above described objects is made by a process in which one or more of the cooling channels (C), for example comprising one or more bundle coolers, or located in a recycle connection, or in a high pressure recycle connection, can advantageously be cleaned without shutting down the plant. The cooling channels (C) may be cleaned by increasing the temperature of the walls of the cooling channel to melt waxy deposits which can be collected at the bottom of the cooling channels.

In one embodiment of the process, the cooling channels to be cleaned (C) are cleaned while one or more compressors are running, for example at least a compressor in fluid communication with the inlet of the reactor, or at least a first compressor (secondary compressor) in fluid communication with the inlet of the reactor and a further compressor (primary compressor) in fluid combination with the first compressor.

In one embodiment, the cooling channels to be cleaned (C) are supplied with a coolant which is at a higher temperature to that supplied during standard use. This may be achieved by rerouting a higher temperature fluid from elsewhere in the plant, for example from a higher temperature coolant circuit. In one aspect of this embodiment, the cooling channels C are cleaned in a process comprising the steps of:
  a. Reducing the flow rate through the cooling channels C;
  b. Increasing the temperature of the coolant supplied to the cooling channels C; and
  c. Collecting a by-product at the bottom of the cooling channels C.

In another embodiment, the cooling jackets of the cooling channels to be cleaned (C) are at least partially emptied of coolant, for example of liquid coolant, such that the cooling channels C are instead contacted with air. In one aspect of this embodiment, the cooling channels C are cleaned in a process comprising the steps of:
  a. Reducing the flow rate through the cooling channels C;
  b. At least partially emptying the cooling jackets of the cooling channels C to leave the cooling channels C in contact with air; and
  c. Collecting a by-product at the bottom of the cooling channels C.

In another embodiment of the disclosure, the cooling channels to be cleaned are provided with a reduced flow rate of coolant. In one aspect of this embodiment, the cooling channels C are cleaned in a process comprising the steps of:
  a. Reducing the flow rate through the cooling channels C;
  b. Reducing the flow rate of coolant supplied to the cooling channels C; and
  c. Collecting a by-product at the bottom of the cooling channels C.

In order to avoid or limit disruption to plant output, in an embodiment there is always at least a subset of cooling channels which are operating in standard/cooling mode. In one embodiment of the present disclosure, the cooling channels are in two subsets which are switched in anti-phase between standard/cooling mode and cleaning/dewaxing mode such that there is at all times one subset in standard/cooling mode and one subset in cleaning/dewaxing mode. "At all times" here may mean for at least about 90% of the time, or at least about 99% of the time, or at least about 99.9% of the time while the plant is in operation.

In one embodiment of the present disclosure, one or more initiators are present in the reactor.

Polymer Product

The polymer product may be polyethylene or a derivative thereof, or a copolymer of ethylene or a derivative thereof.

The polymer product may have a weight average molecular weight determined by GPC with a light scattering detector in a range from about 500 to about 5,000,000 g/mol, or about 750 to about 1,000,000 g/mol, or about 1000 to about 500,000 g/mol.

The polymer products may be one or more selected from the group consisting of ultra-low-molecular-weight polyethylene (ULMWPE or PE-WAX), high-molecular-weight polyethylene (HMWPE), medium-density polyethylene (MDPE), linear low-density polyethylene (LLDPE), low-density polyethylene (LDPE), very-low-density polyethylene (VLDPE) and chlorinated polyethylene (CPE), or low-density polyethylene (LDPE).

In one embodiment, the polymer product has a density in a range from about 0.89 to about 0.96 g/cm$^3$, or about 0.90 to about 0.95 g/cm$^3$, or about 0.91 to about 0.94 g/cm$^3$.

Comonomers

One aspect of the disclosure relates to the homo-polymerization of ethylene. Another aspect of the disclosure relates to the co-polymerization of ethylene with one or more comonomers. In this application, a C$_2$H$_3$ moiety represents a vinyl group.

Comonomers may be used for polymerization with ethylene to obtain copolymers, for example by a free radical polymerization. The copolymers may be ordered polymers, partially ordered polymers and non-ordered polymers. In one embodiment, the content of comonomer units, other than ethylene units, in the copolymer is in a range from about 0.0001 to about 60 wt. %, or from about 0.001 to about 50 wt. %, or from about 0.01 to about 40 wt. %, based on the total weight of the copolymer.

The comonomers may be one or more selected from the group consisting of: an α,β-unsaturated carboxylic acid, the ester of an α,β-unsaturated carboxylic acid, the anhydride of an α,β-unsaturated carboxylic acid or an olefin.

The olefins may be 1-olefins, for example selected from the group consisting of propene, 1-butene, 1-pentene, 1-hexene, 1-octene, 1-decene.

The α,β-unsaturated carboxylic acids may be C$_3$-C$_8$ α,β-unsaturated carboxylic acids, or one or more selected from the group consisting of maleic acid, fumaric acid, itaconic acid, acrylic acid, methacrylic acid and crotonic acid, or derivatives of one or more thereof.

The esters of α,β-unsaturated carboxylic acids, or anhydrides of an α,β-unsaturated carboxylic acid may be derived from C$_3$-C$_8$ carboxylic acids. The esters or anhydrides in this context may comprise from about 3 to about 13 carbon atoms.

The α,β-esters may be one or more selected from the group consisting of methyl methacrylate, ethyl methacrylate, n-butyl methacrylate, tert-butyl methacrylate, methyl acrylate, ethyl acrylate, n-butyl acrylate, 2-ethylhexyl acrylate and tert-butyl acrylate.

Furthermore, carboxylate anions, such as vinyl acetate, may be employed as comonomers.

The anhydrides may be selected from the group consisting of methacrylic anhydride, maleic anhydride and itaconic anhydride.

In one embodiment, the comonomer is one or more selected from the group consisting of 1-hexene, acrylic acid, n-butyl acrylate, tert-butyl acrylate, 2-ethylhexyl acrylate, vinyl acetate and vinyl propionate.

In one embodiment, one or more vinyl silanes is/are employed as comonomer, for example comprising silicon and one or more vinyl groups. The vinyl silanes may be of the general form:

Wherein:
x is 0, 1, 2 or 3, or 2 or 3; or 3;
y is 1, 2, 3 or 4, or 1 or 2, or 1;

X is a halogen, or selected from the group consisting of Cl, Br and I, or selected from the group consisting of Cl and Br; or Cl. X within the same molecule may be the same or different;
z is 0, 1, 2 or 3, or 0 or 1, or 0;
x, y and z sum to 4.

The vinyl silane may be Si(vinyl)H$_3$.

DESCRIPTION OF THE FIGURES

The disclosure is now explained by means of figures which are intended for illustration only and are not to be considered as limiting the scope of the disclosure. In brief, the figures show the following.

FIG. 1 shows schematically the general function of a plant 101 according to the present disclosure. Ethylene and optionally other reactants, such as copolymers and/or modifiers, enter the plant. Optionally, other species such as initiators enter the plant. A product, such as a polymer, exits the plant, for example in the form of solid pellets.

FIG. 2 shows schematically the layout of a plant 200 according to the present disclosure. Polymerization is carried out in a reactor 4, such as a tubular reactor. Ethylene and optionally other comonomers and/or modifiers are introduced via a primary compressor 1, passing subsequently into a secondary compressor 2, through a heater 3 and into the inlet 21 of the reactor 4. Subsequent to the reactor 4, fluid passes from the outlet 22 of the reactor 4 through a high pressure let down 6, through a cooler 7 and into a high pressure separator 8. Higher density products from the high pressure separator 8 pass through a pressure let down 23 to a low pressure separator 9. Higher density products from the low pressure separator 9 pass to a pelletizer 10 which outputs solid pellets of product. A high pressure recycle 11 provides a fluid connection between the outlet side 22 of the reactor and the inlet side 21 of the reactor 4. The inlet of the high pressure recycle 11 is in fluid connection with one outlet of the high pressure separator 8 and the outlet of the high pressure recycle is in fluid connection with the inlet side of the secondary compressor 2. The high pressure recycle comprises one or more cooling channels 12 & 12', and one or more separators 13. Two components 12 and 12' have been shown on the diagram in order to make explicit the fact that there are two or more cooling channels. According to the present disclosure, the high pressure recycle comprises two or more cooling channels arranged in parallel. These cooling channels may be grouped into one or more coolers, such as one or more bundle coolers, or two or more bundle coolers. A low pressure recycle 14 also provides a fluid connection between the outlet side of the reactor and the inlet side of the reactor 4. The low pressure recycle comprises one or more coolers 17, 15, and one or more separators 18, 16. Arrows indicate directions of fluid flow for which the plant is designed.

Figure 3:
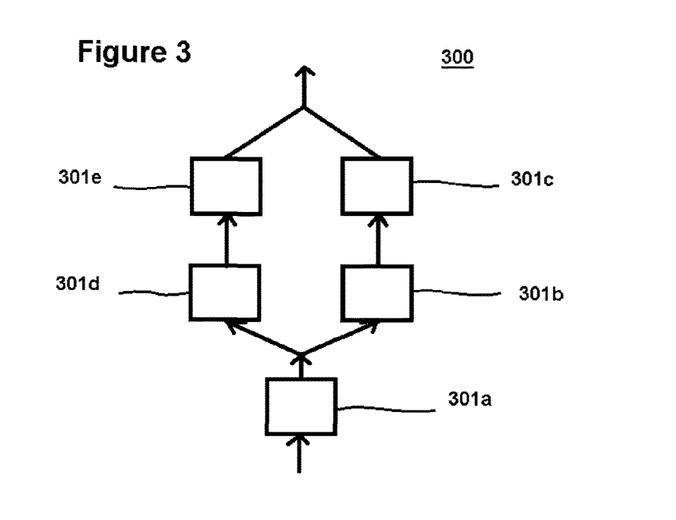
FIG. 3 shows schematically the layout of a group of coolers.

FIG. 3 shows schematically the layout of a group of coolers 300, for example in a recycle connection, or in a high pressure recycle connection. The group of coolers are arranged as follows, ordered in the direction of intended fluid flow: First, a single cooler 301a. Then two parallel paths, one comprising cooler 301b and cooler 301c arranged in series, the other comprising 301d and 301e arranged in series. Each of the coolers 301a-301e comprises one or more cooling channels, such as two or more cooling channels, for example arranged as a bundle cooler. This schematic representation does not express the orientation of the constituent parts relative to vertical. The flow through the coolers of the fluid to be cooled may be downward. The present disclosure is not restricted to such an arrangement. This figure merely shows one embodiment of the configuration.

Figure 4:
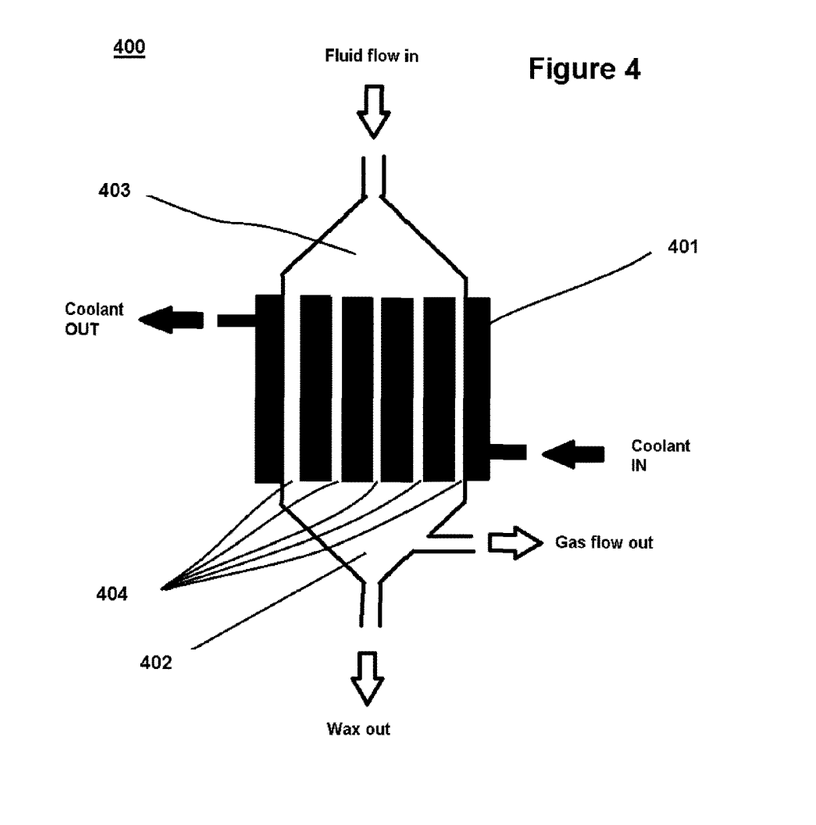
FIG. 4 shows schematically an embodiment for a bundle cooler.

FIG. 4 shows schematically the layout of a bundle cooler 400. The bundle cooler comprises an entry chamber 403 into which fluid to be cooled enters prior to the parallel cooling channels 404. The cooling channels 404 are each connected to the entry chamber 403. In this embodiment, all of the cooling channels 404 are cooled by a common coolant 401. The contiguous nature of the volume of common coolant 401 is not apparent from the two-dimensional figure. The cooling channels 404 could alternatively be cooled by two or more coolants. The cooling channels 404 are all connected to a common exit chamber 402 from which the cooled fluid exits. A exit for waxy residue is provided at the bottom of the cooler and a further exit is provided for the cooled gas stream. This two-dimensional cross section does not demonstrate an arrangement of the cooling channels 404 which has one or more layers of cooling channels 404 parallel to the displayed layer of channels 404.

Test Methods

Density

Density is the polymer density in accordance with standard DIN EN ISO 1183-1:2004, method A (immersion).

Melt Flow Rate (MFR)

The melt flow rate (MFR) was determined according to DIN EN ISO 1133:2005, procedure B, condition D at a temperature of 190° C. under a load of 2.16 kg.

EXAMPLES

Example 1

A polymerization reaction was carried out in a plant according to FIGS. 2. 12 and 12' each are two bundle coolers having 168 cylindrical steel tubes, with each tube having an internal diameter of 12 mm, a length of 11 m for the first cooler second cooler, and cooled with water at a temperature of 37° C. 4 is a tubular reactor comprising a cylindrical steel tube 1.0 km long, folded into 10 m sections, having an internal diameter of 40 mm, and cooled by water at a temperature of 170° C. The average output of polymer (MFR=0.26 g/10 min, density=0.927 g/cm$^3$) and the electrical energy consumption per ton of polymer was measured for a period of 8 hours during normal operation and is given in Table 1. During that time, the suction and discharge conditions of the compressors remained constant.

Over an extended period of operation, wax build up in the bundle coolers was removed by alternating the bundle coolers 12 and 12' in anti-phase between a normal/cooling mode and a cleaning/dewaxing mode. In normal/cooling mode, fluid flowed through the cooling channels of the bundle cooler with a speed of 1.5 to 2 m/s, and the cooling channels were supplied with coolant at a temperature of 37° C. In cleaning/dewaxing mode, fluid flowed through the cooling channels of the bundle cooler with a speed of 0.1 m/s, and the cooling jacket of the bundle cooler was supplied with coolant at a temperature of 140° C.

For one year, no plant shut down for dewaxing was required.

Comparative Example

A polymerization reaction was carried out in a plant according to FIG. 2, except that in place of the coolers 12 and 12', a single cooling channel of steel, with steel thickness of 16 mm, a tube length of 915 m, and cooled by water at a temperature of 20° C., was employed. Fluid passed through the cooling channel with a speed of 4.5 m/s. The average output of polymer (MFR=0.29 g/10 min, density 0.927 g/cm$^3$) and the electrical energy consumption per ton of polymer was measured for a period of 8 hours during normal operation and is given in Table 1. During that time, the suction and discharge conditions of the compressors remained constant.

Over an extended period of time, wax build ups were periodically removed by shutting down the plant and cleaning the cooling channel. 6 days of plant shut down in a year were required for dewaxing of the cooling channel.

TABLE 1

| Example | Polymer output [kg/hour] | suction pressure of secondary compressor [bar] | suction temperature of secondary compressor [° C.] | discharge pressure secondary compressor [bar] | Electric Energy consumption [kWh/t LDPE] | Shutdown requirement for dewaxing |
|---|---|---|---|---|---|---|
| Example 1 | 7160 | 280 | 45 | 2980 | 1049 | 0 days per annum |
| Comparative example | 7130 | 257 | 45 | 2950 | 1064 | 6 days per annum |

REFERENCE LIST

1. Compressor (primary)
2. Compressor (secondary)
3. Heat exchanger
4. Reactor
5. Initiator injection nozzles
I. Initiator
6. Pressure let down (primary)
7. Cooler
8. Separator
9. Separator
10. Pelletizer
11. Recycle connection (high pressure)
12. Cooling channel
12'. Cooling channel
13. Separator
14. Recycle connection (low pressure)
15. Cooler
16. Separator 17. Cooler
18. Separator
21. Reactor inlet
22. Reactor outlet
23. Pressure letdown (secondary)
100. Polymerization process
101. Plant
200. Plant
300. Group of coolers
301. Cooler
400. Bundle cooler
401. Coolant
402. Exit chamber
403. Entry chamber
404. Cooling channels
405. Gas outlet While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

What is claimed is:

1. A plant for performing polymerization, comprising the following plant components in fluid communication:
   a) a reactor with an inlet side and an outlet side; and
   b) a recycle connection positioned in fluid communication between the outlet side of the reactor and the inlet side of the reactor; wherein the recycle connection comprises two or more cooling channels arranged in parallel
   wherein the reactor is a tubular reactor or an autoclave reactor.

2. The plant of claim 1, wherein the recycle connection comprises a bundle cooler comprising two or more cooling channels.

3. The plant of claim 1, wherein the recycle connection comprises two or more bundle coolers arranged in parallel, each comprising two or more cooling channels.

4. The plant of claim 1, wherein at least one of the cooling channels is arranged vertically.

5. A process for the preparation of a polymer by polymerizing ethylene at a pressure from about 100 MPa to about 400 MPa in a plant according to claim 1.

6. The process of claim 5, wherein the process is a continuous process.

7. The process of claim 5, wherein there is a pressure drop across the recycle connection, and wherein the pressure drop across the recycle connection is less than about 20 MPa.

8. The process of claim 5, wherein a fluid to be cooled is flowing one or more of the cooling channels, and wherein the speed of fluid to be cooled flowing in one or more of the cooling channels is less than about 10 m/s.

9. The process of claim 5, wherein the ethylene is comprised in a fluid, comprising the following step:
   a) a first portion of the fluid flows through a subset A, consisting of one or more of the cooling channels, with a mass flow rate $\alpha$, and a second portion of the fluid flows through a subset B, consisting of one or more of the cooling channels not belonging to subset A, with a mass flow rate $\beta$, wherein $\alpha$ is at least twice $\beta$;
      wherein the mass flow rates $\alpha$ and $\beta$ are in terms of the mass flowing through respective cooling channels per second, expressed in $kg \cdot s^{-1}$.

10. The process of claim 9, wherein, in step a), the mass flow rate of coolant supplied to the subset A is higher than the mass flow rate of coolant supplied to the subset B by at least about 10%, based on the mass flow rate of coolant supplied to the subset B, wherein mass flow rate is in terms of the mass of coolant flowing per second, expressed in $kg \cdot s^{-1}$.

11. The process of claim 9, wherein, in step a), the temperature of the coolant supplied to the subset B is higher than the temperature of coolant supplied to subset A by at least about 5 K.

12. The process of claim 9, further comprising the following step:
   b) a first portion of the fluid flows through the subset A of the cooling channels with a mass flow rate $\gamma$, and a second portion of the fluid flows through the subset B of the cooling channels with a mass flow rate $\delta$, wherein $\delta$ is at least twice $\gamma$;
      wherein mass flow rates $\gamma$ and $\delta$ are in terms of the mass flowing through the respective cooling channels per second, expressed in $kg \cdot s^{-1}$.

13. A process for the preparation of a downstream product comprising the following preparation steps:
   a) the preparation of a polymer by the process of claim 5;
   b) further treatment of the polymer to obtain the downstream product.

14. The process of claim 13, wherein the polymer or downstream product is converted into a shaped body.

15. A process for the preparation of a polymer by polymerizing ethylene at a pressure from about 100 MPa to about 400 MPa in a plant comprising the following plant components in fluid communication:
   a) a reactor with an inlet side and an outlet side; and
   b) a recycle connection positioned in fluid communication between the outlet side of the reactor and the inlet side of the reactor; wherein the recycle connection comprises two or more cooling channels arranged in parallel;
   wherein the recycle connection comprises two or more bundle coolers arranged in parallel, each comprising two or more cooling channels
   wherein the reactor is a tubular reactor or an autoclave reactor.

16. The process of claim 15, wherein at least one of the cooling channels is arranged vertically.

17. The process of claim 15, wherein the ethylene is comprised in a fluid and a first portion of the fluid flows through a subset A, consisting of one or more of the cooling channels, with a mass flow rate $\alpha$, and a second portion of the fluid flows through a subset B, consisting of one or more of the cooling channels not belonging to subset A, with a mass flow rate $\beta$, wherein $\alpha$ is at least twice $\beta$;
   wherein the mass flow rates $\alpha$ and $\beta$ are in terms of the mass flowing through respective cooling channels per second, expressed in $kg \cdot s^{-1}$.

18. The process of claim 17, wherein the mass flow rate of coolant supplied to the subset A is higher than the mass flow rate of coolant supplied to the subset B by at least about 10%, based on the mass flow rate of coolant supplied to the subset B, wherein mass flow rate is in terms of the mass of coolant flowing per second, expressed in $kg \cdot s^{-1}$.

19. The process of claim 17, wherein the temperature of the coolant supplied to the subset B is higher than the temperature of coolant supplied to subset A by at least about 5 K.

* * * * *

UNITED STATES PATENT AND TRADEMARK OFFICE
CERTIFICATE OF CORRECTION

PATENT NO. : 10,308,738 B2
APPLICATION NO. : 15/579882
DATED : June 4, 2019
INVENTOR(S) : Wolf et al.

It is certified that error appears in the above-identified patent and that said Letters Patent is hereby corrected as shown below:

In the Specification

In Column 1, Line 27, delete "plastics" and insert -- plastic --, therefore
In Column 1, Line 54, after "effects" insert -- . --
In Column 2, Line 45, delete "presser" and insert -- pressure --, therefore Signed and Sealed this
Fifth Day of July, 2022

Katherine Kelly Vidal
*Director of the United States Patent and Trademark Office*